US008968915B2

(12) United States Patent  
Ogg

(10) Patent No.: US 8,968,915 B2
(45) Date of Patent: *Mar. 3, 2015

(54) RECHARGEABLE ZNMN FLAT PLATE ELECTRODE CELL

(75) Inventor: Randy Ogg, Newberry, FL (US)

(73) Assignee: Encell Technology, Inc., Alachua, FL (US)

( * ) Notice: Subject to any disclaimer, the term of this patent is extended or adjusted under 35 U.S.C. 154(b) by 227 days.

This patent is subject to a terminal disclaimer.

(21) Appl. No.: 13/120,441

(22) PCT Filed: Sep. 28, 2009

(86) PCT No.: PCT/US2009/058614
§ 371 (c)(1),
(2), (4) Date: Mar. 23, 2011

(87) PCT Pub. No.: WO2010/037025
PCT Pub. Date: Apr. 1, 2010

(65) Prior Publication Data
US 2011/0183188 A1  Jul. 28, 2011

Related U.S. Application Data

(60) Provisional application No. 61/100,318, filed on Sep. 26, 2008.

(51) Int. Cl.
*H01M 6/12* (2006.01)
*H01M 4/04* (2006.01)
(Continued)

(52) U.S. Cl.
CPC ............ *H01M 4/0402* (2013.01); *H01M 4/244* (2013.01); *H01M 4/485* (2013.01);
(Continued)

(58) Field of Classification Search
CPC ........ H01M 4/244; H01M 4/50; H01M 4/808
USPC ......... 429/129–141, 161, 162, 224, 229–231, 429/152–155, 218.1; 187/290; 29/623.1
See application file for complete search history.

(56) References Cited

U.S. PATENT DOCUMENTS 6,238,819 B1 * 5/2001 Cahill et al. .................. 429/162
7,008,723 B2 3/2006 Daniel-Ivad
(Continued)

FOREIGN PATENT DOCUMENTS

CA  2 389 907 A1  12/2003
CA  2389907  * 12/2003

OTHER PUBLICATIONS

David Linden, Handbook of Batteries, 2002, McGraw-Hill, 3rd Edition, Chapter 8.7.1, p. 220-221; Chapter 31.1, p. 913; Chapter 31.4, p. 916.*

(Continued)

*Primary Examiner* — Milton I Cano
*Assistant Examiner* — Jimmy K Vo
(74) *Attorney, Agent, or Firm* — E. Joseph Gess; Melissa M. Hayworth; Mary R. Bram

(57) ABSTRACT

Provided is a flat plate electrode cell, comprises positive electrode plates and negative electrode plates. The positive electrode plates each comprise manganese and compressed metal foam. The negative electrode plates each comprise zinc and compressed metal foam. Both the positive and negative electrodes can have alignment tabs, wherein the flat plate electrode cell can further comprise electrical terminals formed from the aligned tabs. The rechargeable flat plate electrode cell of the present disclosure, formed from compressed metal foam, provides both low resistance and high rate performance to the electrodes and the cell. Examples of improvements over round bobbin and flat plate cells are current density, memory effect, shelf life, charge retention, and voltage level of discharge curve. In particular, the rechargeable flat plate electrode cell of the present disclosure provides longer cycle life with reduced capacity fade as compared with known round bobbin and flat plate cells.

9 Claims, 3 Drawing Sheets

(51) Int. Cl.
  *H01M 4/24* (2006.01)
  *H01M 4/485* (2010.01)
  *H01M 4/50* (2010.01)
  *H01M 4/80* (2006.01)
  *H01M 4/42* (2006.01)
  *H01M 10/04* (2006.01)
  *H01M 10/0585* (2010.01)
  *H01M 10/28* (2006.01)
  *H01M 6/02* (2006.01)
  *H01M 10/02* (2006.01)

(52) U.S. Cl.
  CPC ............. *H01M 4/502* (2013.01); *H01M 4/808* (2013.01); *H01M 4/42* (2013.01); *H01M 4/50* (2013.01); *H01M 10/0413* (2013.01); *H01M 10/0585* (2013.01); *H01M 10/281* (2013.01); *H01M 6/02* (2013.01); *H01M 10/02* (2013.01); *Y02E 60/124* (2013.01)
  USPC ......... 429/162; 429/218.1; 429/224; 429/229

(56) References Cited

U.S. PATENT DOCUMENTS

| | | | |
|---|---|---|---|
| 7,169,508 B2 | 1/2007 | Daniel-Ivad | |
| 7,377,948 B2 | 5/2008 | Faris | |
| 7,754,386 B2 | 7/2010 | Daniel-Ivad | |
| 2004/0058235 A1* | 3/2004 | Huang et al. | 429/164 |
| 2005/0064292 A1* | 3/2005 | Phillips et al. | 429/246 |
| 2006/0046135 A1* | 3/2006 | Huang | 429/128 |
| 2006/0204839 A1 | 9/2006 | Richards et al. | |

OTHER PUBLICATIONS

Roberge, P.R, et al. "Electrochemical characterizaon of flat-plate rechargeable alkaline manganese dioxide-zinc cells" *J. Power Sources* 47:13-26 (1994).

Stani, Andreas, et al., "Development of flat plate rechargeable alkaline manganese dioxide-zinc cells" *J. Power Sources* 153:405-412 (2006).

International Search Report from PCT/US2009/058614, mailed Nov. 19, 2009, 3 pages.

* cited by examiner

RECHARGEABLE ZNMN FLAT PLATE ELECTRODE CELL

BACKGROUND

Currently, the only batteries (rechargeable or non-rechargeable) commercially available with ZnMn chemistries are round bobbin cells. ZnMn chemistries are low cost and lightweight, are environmentally benign, and have a very long charge retention. Round bobbin cells have a positive electrode that is stamped or pressed into a cylindrical hollow pellet and seated into a can, and the negative electrode is a gel that is filled into the center void of the positive electrode.

The high internal resistance of low capacity round bobbin cells limits the currents (i.e., power) that they can deliver. In contrast, flat plate (electrode) cells can be scaled up to large sizes providing high currents and storage capacities.

CA 2 389 907 A1 relates to a method of producing flat plate electrodes in a small format that exhibit high current densities, higher utilization of the active materials, and better rechargeability. The method of forming the electrodes requires the active materials, binders, thickening agents, additives, and an alkaline electrolyte to form a paste that is applied to a current collector. CA 2 389 907 A1 provides is a flat plate rechargeable alkaline manganese dioxide-zinc cell.

What is needed are low cost, lightweight, environmentally friendly batteries that can be used, for example, for large power back-up systems, which are primarily currently served by lead acid and NiCd chemistries. Such batteries should exhibit improvements in, for example, current density, memory effect (i.e., capacity fade), shelf life, charge retention (e.g., at higher operation temperatures), and voltage level of discharge curve over known round bobbin and flat plate cells.

SUMMARY

Provided is a flat plate electrode cell. The flat plate electrode cell comprises positive electrode plates and negative electrode plates. The positive electrode plates each comprise manganese and compressed metal foam. The negative electrode plates each comprise zinc and compressed metal foam. The positive electrode plates can have aligned tabs and the negative electrode plates can have aligned tabs, and the flat plate electrode cell can further comprise a positive terminal formed from the aligned tabs of the positive electrode plates and a negative terminal formed from the aligned tabs of the negative electrode plates.

The rechargeable flat plate electrode cell of the present disclosure provides improvements in, for example, current density, memory effect (i.e., capacity fade), shelf life, charge retention (e.g., at higher operation temperatures), and voltage level of discharge curve over known round bobbin and flat plate cells. In particular, the rechargeable flat plate electrode cell of the present disclosure provides longer cycle life with reduced capacity fade as compared with known round bobbin and flat plate cells.

The rechargeable flat plate electrode cell of the present disclosure achieves such benefits primarily through unique electrode formation. In particular, both the positive and negative electrode of the rechargeable flat plate electrode cell of the present disclosure are formed from compressed metal foam, which provides both low resistance and high rate performance to the electrodes and the cell.

DETAILED DESCRIPTION

Figure 1:
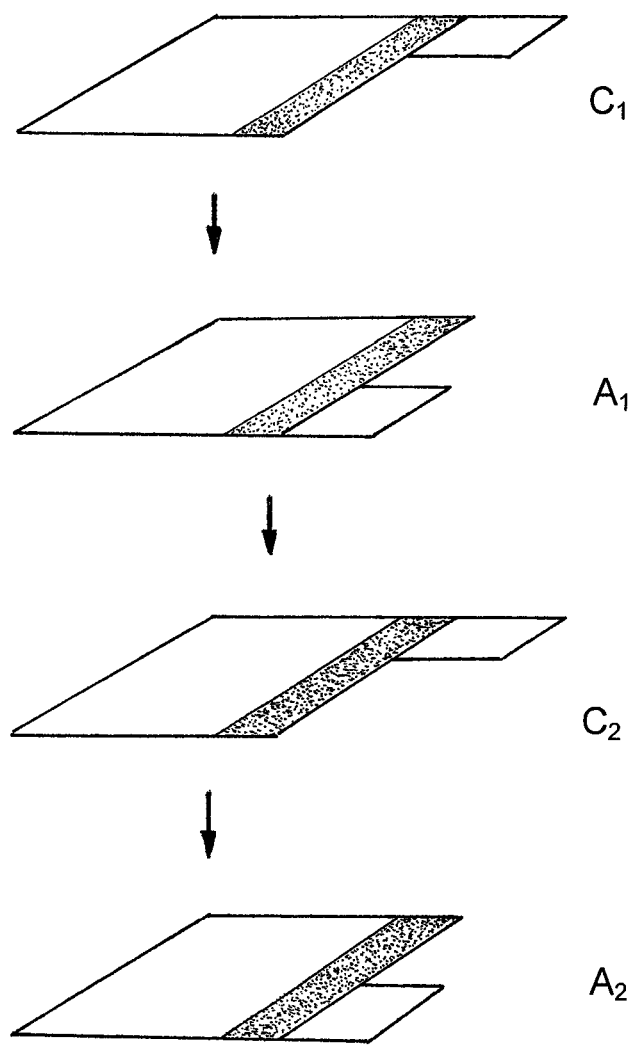
FIG. 1 depicts an embodiment of the assembly of positive (cathode) electrode plates and negative (negative) electrode plates.

The rechargeable flat plate electrode cell of the present disclosure reduces the material costs, weight, toxicity (regulated limitations), volume, and maintenance of known batteries (e.g., batteries used for stationary power back-up applications), while increasing charge retention and reliability. The rechargeable flat plate electrode cell of the present disclosure can be used wherever high capacity DC power storage is required, can replace lead acid or NiCd large format batteries or other high power electric back-up systems, and can be used directly in applications that can accept a wide voltage range and in conjunction with a voltage stabilizing system when the application requires a narrower voltage range.

The rechargeable flat plate electrode cell of the present disclosure comprises one or more anode plates comprising anode paste and one or more cathode plates comprising cathode paste. The anode and cathode pastes each comprises active material metal powders (e.g., zinc and manganese, respectively) mixed with aqueous or organic binder to create a paste that can be consistently coated on one or both sides of a substrate. The substrate holds the active material (i.e., the paste) and acts as a current collector. In an embodiment, the substrate is made of a conductive material such as steel, Ni, or Cu, and may be plated with indium or Ni (i.e., a material that is non-active relative to $MnO_2$) for the cathode and Cu (i.e., a non-active material relative to zinc) for the anode. In an embodiment, the substrate comprises a porous conductive substrate such as, for example, perforated metal, metal foam, metal felt, expanded metal, or carbon foam. More specifically, the substrate comprises nickel foam and/or copper plated nickel foam. Accordingly, the anode or cathode paste is coated on and throughout the foam mesh.

The coated substrate is dried and sized (i.e., compressed) to create a highly conductive, dense, porous flat plate electrode. The flat plate electrodes are wrapped and sealed in a layer of barrier and separator material to prevent short circuits and dendrite growth. The wrapped and sealed flat plate electrodes are stacked in an alternating cathode and anode pattern that is repeated until a desired capacity of the cell is reached. Tabs (collectors) of the flat plate cathode electrodes are connected together and tabs of the flat plate anode electrodes are connected together. In an embodiment, the rechargeable flat plate electrode cell of the present disclosure is bi-polar. Such bipolar batteries use a substrate to hold the positive active materials on one side and negative active materials on the other and the substrate acts as a cell wall. The cell walls are sealed either peripherally or tangentially to hold internal pressure and electrolyte.

In metal foams, typically 75-95% of the volume consists of void spaces. As such, the use of metal foams allows for thicker electrode substrates without increasing the resistance of the electrode substrates. Target compression from sizing for this embodiment is between about 42% and 45%, which gives desirable porosity, required for low resistance/high rate performance of the rechargeable flat plate electrode cell.

Without wishing to be bound by any theories, it is believed that the high density of compression reduces the resistance within the paste by reducing the distance between active particles in the active material and reduces the resistance to the substrate by bringing the active particles closer to it. The high density reduces the volume so the energy density is increased. The high density also reduces the void volume in the active material which reduces the amount of electrolyte required to fill the electrode which in turn reduces the rate at which dendrites are formed which protects the cell from shorting and increases cycle life. The density level is critical since over-compression will cause dry spots in the active material where electrolyte cannot get to. These dry spots are very high resistance which reduces performance and can create gassing areas which cause cell failure.

Without sizing, desired energy density and high power capability are not achieved. The target coated sized thickness for the cathode is less than about 0.0300 inches. Coated sized thickness for the cathode greater than about 0.0300 inches results in rate capability (power) losses, while coated sized thickness for the cathode less than about 0.0200 inches results in energy density losses, due to excess inter electrode spacing and substrate relative to active material.

The anode paste comprises about 75-98 weight %, for example, about 83.1 weight %, zinc active material; about 0.01-1.0 weight %, for example, about 0.27 weight %, polymeric binder; and about 0-20 weight %, for example, about 16.6 weight %, solid zinc oxide. Exemplary zinc active materials include lead-free zinc and zinc alloy, such as, for example, in metallic, powder, granular, particulate, fibrous, or flake form.

The cathode paste comprises about 70-90 weight % electrolytic manganese dioxide; about 2-15 weight %, for example, about 7.5 weight %, graphite and/or carbon black; about 3-10 weight %, for example, about 6 weight %, polymeric binder; about 1-15 weight %, for example, about 5 weight %, barium compound; and about 0.01-10 weight %, for example, about 5 weight %, hydrogen recombination catalyst. Exemplary barium compounds include barium oxide, barium hydroxide, and barium sulfate. Exemplary hydrogen recombination catalysts include silver, silver oxides, and hydrogen absorbing alloys. The cathode paste may further comprise indium.

Exemplary polymeric binders of either the cathode paste or anode paste include carboxymethyl cellulose (CMC), polyacrylic acid, starch, starch derivatives, polyisobutylene, polytetrafluoroethylene, polyamide, polyethylene, and a metal stearate. The polymeric binder of either the cathode paste or anode paste can include conductive graphite, for example, conductive graphite having an average particle size between 2 and 6 microns.

The rechargeable flat plate electrode cell of the present disclosure differs from currently commercially available rechargeable ZnMn batteries in that the flat plate electrodes of the cell:
  are flat;
  have an internal carrier (substrate);
  have a current collector attached to the internal carrier; and
  have the anode's active material completely sealed in a barrier to stop dendrite failures.

The rechargeable flat plate electrode cell of the present disclosure further differs from currently commercially available batteries in that:
  flat plate cathode electrodes are produced by use of aqueous or organic binder and metal powder which is coated, dried and sized, instead of a glycol gel that is injected into a barrier wrapped pocket, which allows for the production of high volume flat plate electrodes required for economical power back-up batteries;
  flat plate anode electrodes are produced by use of an aqueous or organic binder and metal powder which is coated, dried, and sized, instead of mixing and then high pressure stamp forming into a ridged pellet, which allows for the production of high volume flat plate electrodes required for economical power back-up batteries;
  multiple flat plate cathode electrodes and flat plate anode electrodes can be connected in parallel then placed in a container, filled with electrolyte, and then sealed, instead of a cathode pellet wedged into a metal can, a barrier separator inserted into the cathode pellet cavity, and then anode gel injected into the cavity with a metal pin inserted into the center of the gel, and closed using a seal ring and crimping, which allows for the high capacity required for stationary power back-up batteries.

Advantages of the rechargeable flat plate electrode cell of the present disclosure include:
  reducing battery cost through lower material costs, lower production costs, and using fewer components;
  reducing battery weight through higher energy dense chemistry, and using fewer components;
  reducing battery volume through higher energy dense chemistry, and using fewer components;
  reducing environmental and regulated (storage, disposal, shipping) issues by using environmentally friendly chemistry;
  improving reliability by using batteries with higher capacities and internal series collectors so fewer batteries/connections are used;
  reducing continuous energy losses by using a chemistry with higher charge retention; and
  reduces energy losses in the system by improving performance (charge efficiency, rate capability) through battery design that reduces losses from internal resistance in the battery.

FIG. 1 depicts an embodiment of the assembly of positive (cathode) electrode plates and negative (anode) electrode plates. In particular, cathode plate $C_1$ is stacked atop anode plate $A_1$, which is stacked atop cathode plate $C_2$, which is stacked atop anode plate $A_2$. While not shown in FIG. 1, in the electrode stack, the alternating positive and negative electrode plates can be separated by separator layers, which insulate the electrode plates from one another. Alternatively, the flat plate electrodes can be wrapped and sealed in a layer of barrier and separator material to prevent short circuits and dendrite growth, as explained above. The lightly shaded section of each of the electrode plates represents the portion thereof upon which cathode paste or anode paste, respectively, has been applied. The darkly shaded section of each of the electrode plates represents the portion thereof which has been pressed (i.e., "coined") to create a thin, flat, high density area (e.g., about 0.15 inch wide), to which a tab can be welded. Accordingly, the unshaded section of each of the electrode plates represents the tab (e.g., 1 inch wide) welded to the electrode plate. The tab can be, for example, copper or copper plated nickel. A positive terminal is formed from aligned tabs of the positive electrode plates and a negative terminal is formed from aligned tabs of the negative electrode plates.

Figure 2:
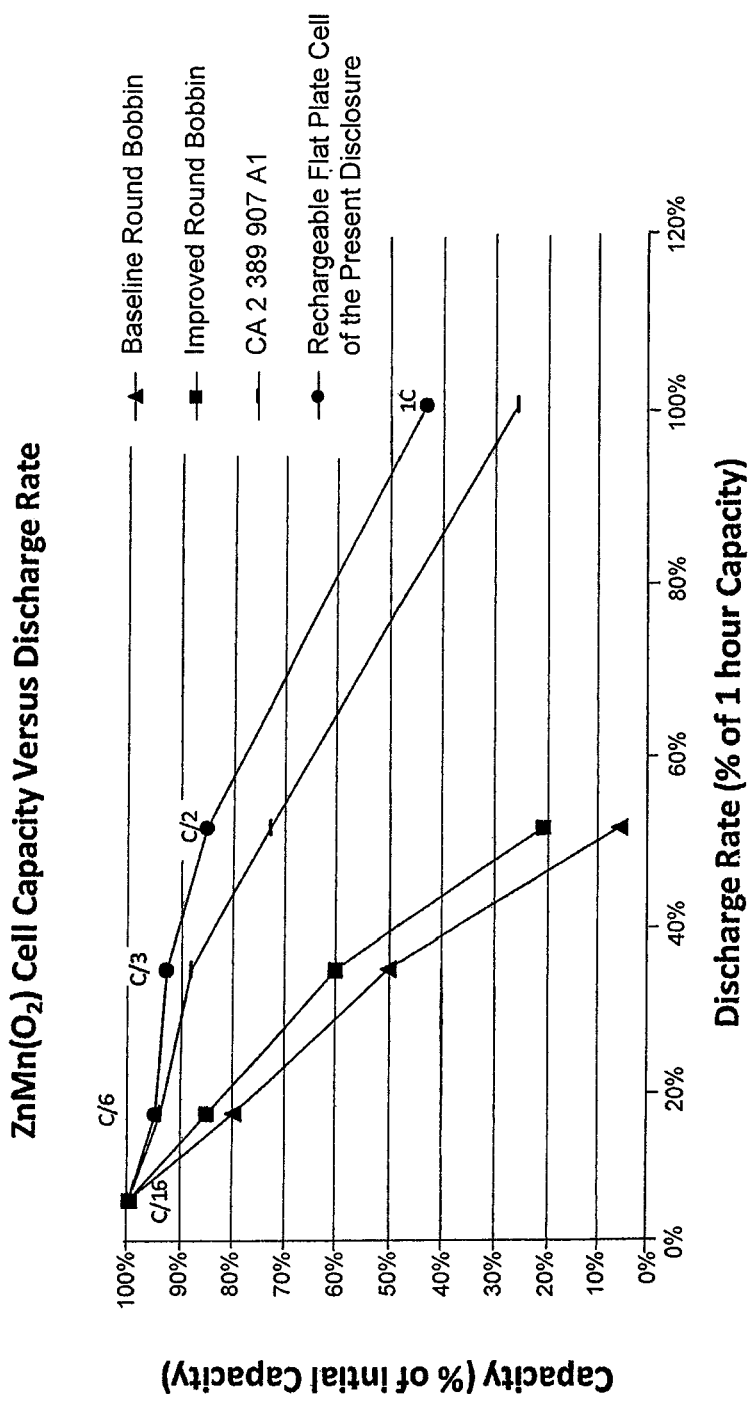
FIG. 2 shows the improvements of the rechargeable flat plate electrode cell of the present disclosure over commercially available ZnMn round bobbin consumer cells in terms of Cell Capacity Versus Discharge Rate.
Figure 3:
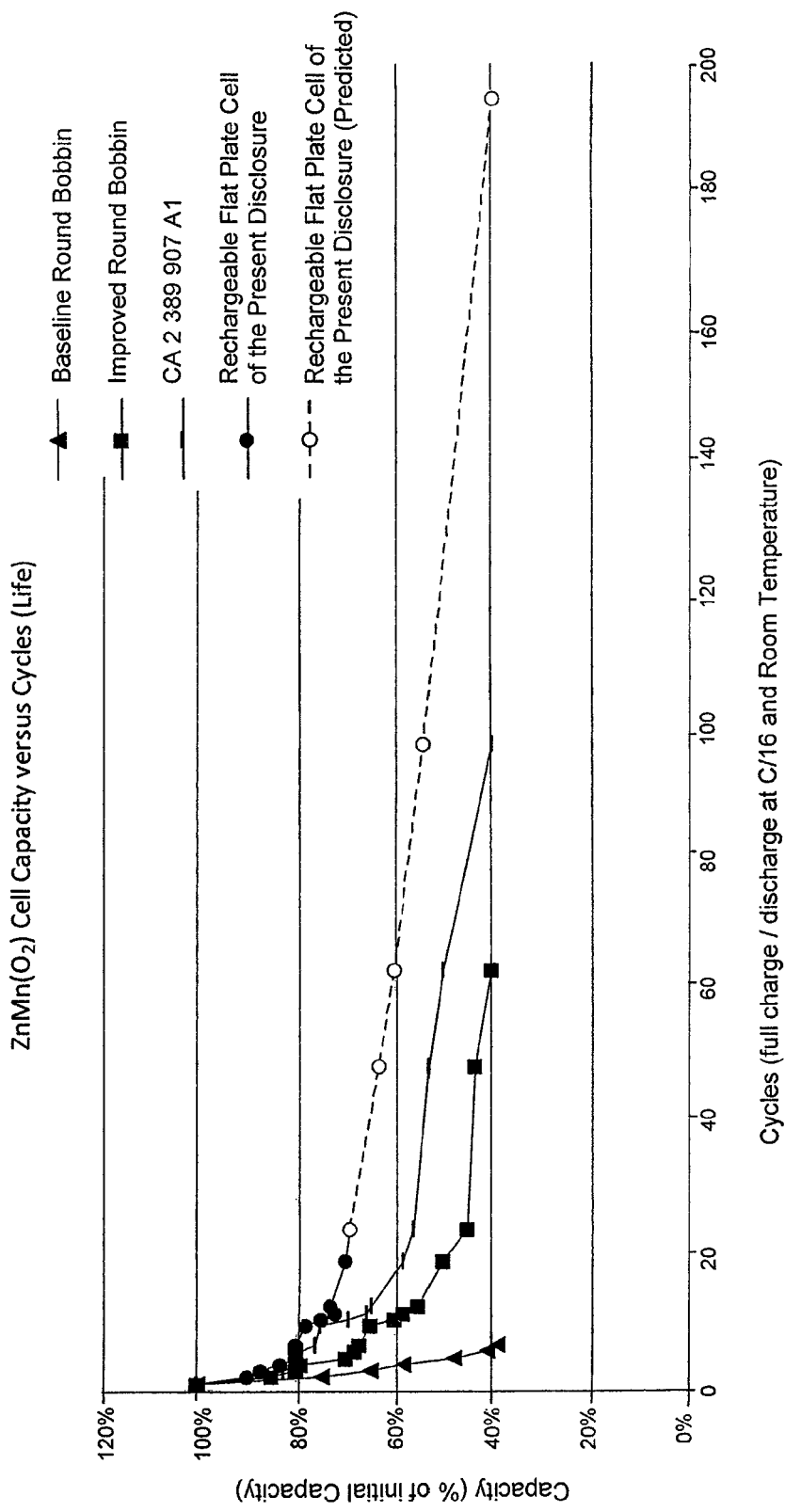
FIG. 3 shows the improvements of the rechargeable flat plate electrode cell of the present disclosure over commercially available ZnMn round bobbin consumer cells in terms of Cell Capacity versus Cycles/Life.

As illustrated in FIGS. 2 and 3, the rechargeable flat plate electrode cell of the present disclosure exhibits improved performance over commercially available ZnMn round bobbin consumer cells. In particular, FIG. 2 shows the improvements of the rechargeable flat plate electrode cell of the present disclosure over commercially available ZnMn round bobbin consumer cells (i.e., "Baseline Round Bobbin" and "Improved Round Bobbin") as well as a cell as disclosed in CA 2 389 907 A1 in terms of Cell Capacity (expressed as a percentage of initial capacity) Versus Discharge Rate (expressed as a percentage of one hour capacity), while FIG. 3 shows the improvements of the rechargeable flat plate electrode cell of the present disclosure over commercially available ZnMn round bobbin consumer cells (i.e., "Baseline Round Bobbin" and "Improved Round Bobbin") as well as a cell as disclosed in CA 2 389 907 A1 in terms of Cell Capacity (expressed as a percentage of initial capacity) versus Cycles/Life (expressed as full charge/discharge at C/16 and Room Temperature). As can be seen from FIG. 2, the rechargeable flat plate electrode cell of the present disclosure has a capacity of greater than 50% of initial capacity, and in particular, a capacity of greater than 80% of initial capacity, at a discharge rate of greater than or equal to 50% of one hour capacity. As can be seen from FIG. 3, the rechargeable flat plate electrode cell of the present disclosure has a capacity of greater than or equal to 60% of initial capacity at greater than or equal to 25 cycles at room temperature.

With further reference to FIG. 3, the Baseline Round Bobbin was tested for seven cycles, the Improved Round Bobbin was tested for sixty-five cycles, and a cell as disclosed in CA 2 389 907 A1 was tested for one hundred cycles. The rechargeable flat plate electrode cell of the present disclosure was tested for twenty-five cycles, with predicted results shown for up to 200 cycles.

Additionally performance characteristics of the rechargeable flat plate electrode cell of the present disclosure can include capacity of greater than 5 Ahr, cycle life exceeding 200 cycles at 80% DOD above 50% initial capacity, power exceeding C/2 rate to 1 V at 50% initial capacity and 2C rate to 1V at 25% initial capacity, energy density exceeding 90 Whr/kg, and power density exceeding 180 W/kg. DOD, or depth of discharge, is a measure of how much energy has been withdrawn from a battery, expressed as a percentage of full capacity. C/2 rate refers to a discharge rate of 50% of one hour capacity.

The rechargeable flat plate electrode cell of the present disclosure can be utilized in a vehicle for starting a internal combustion engine, or in a more portable format can be used in power tools, cell phones, computers, and portable electronic devices.

The following illustrative examples are intended to be non-limiting.

EXAMPLES

With regard to formation of the flat plate anode electrodes, 360 grams of Zn, 72 grams of ZnO, and 59.88 grams of 2% CMC gel were mixed to form a paste comprising 83.1 weight % zinc active material (i.e., Zn), 16.6 weight % solid zinc oxide, and 0.27 weight % polymeric binder. The paste was applied to one side of copper plated nickel foam and pressed/worked in. The copper was plated on the nickel foam via copper plating 1A for 30 minutes. Water was evaporated from the paste, and the dried pasted foam was pressed to approximately 50% of its original thickness. A 0.15 inch strip at the top of each flat plate anode electrode was coined for attachment of a tab. Further details of formed flat plate anode electrodes can be found in Table 1, below. With regard to the capacity calculations in Table 1, the capacity of 0.625 g Zn is 512 mAh.

With regard to formation of the flat plate cathode electrodes, 41.90 grams of 2% CMC gel and 100 grams of cathode powder ground down to $1/10^{th}$ of the initial particle size were mixed to form a paste. The cathode powder comprised electrolytic manganese dioxide, 7.5 weight % graphite/carbon black, 5 weight % polymeric binding agent, 5 weight % barium compound, and 5 weight % hydrogen recombination catalyst, and is pressed to form high density initial particles. The 2% CMC gel provided an additional 1 weight % polymeric binding agent to provide a paste with a total of 6 weight % polymeric binding agent. The paste was applied to one side of nickel foam having a weight basis of $0.255$ g/in$^2$. Water was evaporated from the paste, and the dried pasted foam was pressed to approximately 50% of its original thickness. A 0.15 inch strip at the top of each flat plate cathode electrode was coined for attachment of a tab. Further details of formed flat plate cathode electrodes can be found in Table 2, below.

TABLE 1

Anode Design

| Substrate | Weight (g) | Width (in) | Length (in) | Paste Weight (g) | Sized Width (in) | Sized Length (in) | Sized Thickness (Substrate and Paste) (in) | Paste Weight/ Sized Area (g/in$^2$) | A·h/in$^2$ | A·h/in$^3$ |
|---|---|---|---|---|---|---|---|---|---|---|
| 1 | 2.669 | 2.52 | 2.37 | 13.098 | 2.54 | 2.50 | 0.0370 | 2.063 | 1.406 | 37.988 |
| 2 | 2.697 | 2.52 | 2.37 | 13.258 | 2.54 | 2.52 | 0.0370 | 2.071 | 1.411 | 38.147 |
| 3 | 2.634 | 2.53 | 2.38 | 15.061 | 2.54 | 2.53 | 0.0380 | 2.344 | 1.597 | 42.027 |
| 4 | 2.679 | 2.52 | 2.35 | 13.833 | 2.53 | 2.47 | 0.0370 | 2.214 | 1.508 | 40.767 |
| 5 | 2.631 | 2.53 | 2.38 | 15.144 | 2.55 | 2.55 | 0.0380 | 2.329 | 1.587 | 41.763 |
| 6 | 2.699 | 2.50 | 2.39 | 14.534 | 2.53 | 2.50 | 0.0370 | 2.298 | 1.566 | 42.319 |
| 7 | 2.375 | 2.54 | 2.36 | 15.238 | 2.56 | 2.49 | 0.0380 | 2.390 | 1.629 | 42.867 |
| 8 | 2.360 | 2.54 | 2.36 | 14.495 | 2.55 | 2.48 | 0.0370 | 2.292 | 1.562 | 42.212 |
| 9 | 2.339 | 2.52 | 2.38 | 15.492 | 2.55 | 2.48 | 0.0380 | 2.450 | 1.669 | 43.929 |
| 10 | 2.308 | 2.53 | 2.38 | 16.602 | 2.55 | 2.50 | 0.0390 | 2.604 | 1.775 | 45.502 |
| 11 | 2.618 | 2.53 | 2.37 | 14.380 | 2.54 | 2.51 | 0.0360 | 2.256 | 1.537 | 42.694 |

TABLE 2

Cathode Design

| Substrate | Weight (g) | Width (in) | Length (in) | Thickness (in) | Coated Length (in) | Paste Weight (g) | Sized Width (in) | Sized Length (in) | Sized Coated Length (in) | Sized Thickness (Substrate and Paste) (in) | Paste Weight/ Sized Coated Area (g/in$^2$) | mAh/in$^2$ |
|---|---|---|---|---|---|---|---|---|---|---|---|---|
| 1 | 1.168 | 2.53 | 1.81 | 0.058 | 1.54 | 4.492 | 2.57 | 2.02 | 1.77 | 0.0250 | 0.988 | 216 |
| 2 | 1.170 | 2.52 | 1.82 | 0.054 | 1.56 | 4.129 | 2.57 | 1.97 | 1.72 | 0.0235 | 0.934 | 205 |
| 3 | 1.141 | 2.50 | 1.79 | 0.050 | 1.56 | 3.555 | 2.52 | 1.90 | 1.66 | 0.0225 | 0.850 | 186 |
| 4 | 1.149 | 2.49 | 1.81 | 0.049 | 1.57 | 3.577 | 2.54 | 1.94 | 1.69 | 0.0230 | 0.833 | 182 |
| 5 | 1.143 | 2.49 | 1.80 | 0.048 | 1.58 | 3.756 | 2.54 | 1.94 | 1.72 | 0.0230 | 0.860 | 188 |
| 6 | 1.138 | 2.48 | 1.80 | 0.050 | 1.58 | 3.815 | 2.53 | 1.94 | 1.72 | 0.0235 | 0.877 | 192 |
| 7 | 1.139 | 2.51 | 1.78 | 0.052 | 1.55 | 4.328 | 2.56 | 1.96 | 1.75 | 0.0235 | 0.966 | 212 |
| 8 | 1.154 | 2.50 | 1.81 | 0.050 | 1.56 | 4.067 | 2.56 | 1.96 | 1.69 | 0.0235 | 0.940 | 206 |
| 9 | 1.152 | 2.51 | 1.80 | 0.050 | 1.58 | 4.041 | 2.56 | 1.94 | 1.74 | 0.0230 | 0.907 | 199 |

Many modifications of the exemplary embodiments disclosed herein will readily occur to those of skill in the art. Accordingly, the rechargeable flat plate electrode cell of the present disclosure is to be construed as including all structure and methods that fall within the scope of the appended claims.

What is claimed is:

1. A flat plate electrode cell comprising:
   positive electrode plates each comprising:
      manganese and carboxylmethyl cellulose (CMC) contained throughout a compressed metal foam, with the metal foam having a compression sizing between about 42 and 45% of the original thickness; and
   negative electrode plates each comprising:
      zinc and carboxylmethyl cellulose (CMC) contained throughout a compressed metal foam, with the metal foam having a compression sizing between about 42 and 45% of the original thickness.

2. The flat plate electrode cell of claim 1, wherein:
   the positive electrode plates have aligned tabs; and
   the negative electrode plates have aligned tabs; and
   the flat plate electrode cell further comprises:
      a positive terminal formed from the aligned tabs of the positive electrode plates; and
      a negative terminal formed from the aligned tabs of the negative electrode plates.

3. The flat plate electrode cell of claim 1, wherein the negative electrode plate comprises an anode paste.

4. The flat plate electrode cell of claim 3, wherein the anode paste comprises 75-98 weight % zinc active material.

5. The flat plate electrode cell of claim 4, wherein the zinc active material comprises lead-free zinc or zinc alloy.

6. The flat plate electrode cell of claim 1, wherein the positive electrode plate comprises a cathode paste.

7. The flat plate electrode cell of claim 6, wherein the cathode paste comprises from about 70 to 90 weight % electrolytic manganese dioxide.

8. The flat plate electrode cell of claim 6, wherein the cathode paste comprises from about 2 to 15 weight % of graphite and/or carbon black.

9. The flat plate electrode cell of claim 1, wherein the CMC is present in the form of 2% CMC gel.

* * * * *